United States Patent [19]

Mack

[11] 4,187,158
[45] Feb. 5, 1980

[54] RAPID PHASE TRANSFORMATION FOR POLYBUTENE-1

[75] Inventor: Mark P. Mack, Ponca City, Okla.

[73] Assignee: Conoco, Inc., Ponca City, Okla.

[21] Appl. No.: 893,855

[22] Filed: Apr. 6, 1978

[51] Int. Cl.$^2$ ................................................ C08F 6/00
[52] U.S. Cl. ............................ 204/159.2; 526/348.6;
528/493; 528/494; 528/496; 528/497; 528/498; 528/499; 528/503
[58] Field of Search ...................... 528/494, 497, 498; 204/159.2; 260/897 A

[56] References Cited

U.S. PATENT DOCUMENTS

| 3,499,884 | 3/1970 | Wood | 260/94.9 |
|---|---|---|---|
| 3,558,551 | 1/1971 | Gilbert et al. | 260/41 |

OTHER PUBLICATIONS

Journal of Pol. Sci., A, 3, pp. 3803–3813 (1965), I. D. Rubin.
Journal of Pol. Sci., 62 (174) pp. S70–S73 (1962).
Journal of Pol. Sci., B, 1(11), pp. 587–591 (1963).

*Primary Examiner*—Stanford M. Levin
*Attorney, Agent, or Firm*—Cortlan R. Schupbach, Jr.

[57] ABSTRACT

Polybutene-1 in type II form can be accelerated in a phase transformation to the stable polybutene-1 type I form by applying a volatile solvent such as n-hexane and allowing the solvent to evaporate. The phase transformation can be accelerated by additional treatment with heat below the melt temperature of about 90° C. and/or ultrasonic sound.

5 Claims, No Drawings

RAPID PHASE TRANSFORMATION FOR POLYBUTENE-1

This invention relates to a method for accelerating the phase transformation of poly(butene-1) from type II to type I form. More particularly, this invention relates to a method for accelerating the phase change of poly(butene-1) (PB) by application of volatile solvents followed by evaporation of said solvent.

It has long been known that crystalline alphaolefins exhibit polymorphism (alternately called phases, types or forms). In particular, isotactic PB exists in at least 4 distinct crystalline forms. This polymorphic behavior of PB was first reported by Natta and coworkers in *Nuovo Cimento,* 15, special number 1, 52 (1960). The X-ray and density properties of the polymorphs were further studied by Zanetti et al, and reported in *Chem. Ind.,* 43, 735 (1961).

Cooling a fresh melt of PB results in the formation of unstable tetragonal crystallites referred to by the previous workers as type II PB. These crystals gradually transform upon standing at room temperature to the stable hexagonal polymorph, type I PB. Complete type II to type I transformation may take from about a day to more than a week depending upon such variables as molecular weight, copolymerization, pressure, temperature and the presence of impurities. Descriptions of such transformations can be found in *Polymer Letters, Journal of Polymer Science,* Volume 2, pages 519–521 (1964). This article describes the various phase transformations of PB through various processing conditions including the hexagonal stable type I, the tetragonal unstable type II and the orthorombic stable type III. Further discussions can be found in the *Journal of Polymer Science,* part A, volume 3, pages 3803–3813 (1965), I. D. Rubin; and *Journal of Polymer Science, Polymer Letters* volume 5, pages 839841 (1967), R. J. Schaffhauser. These references are representative of the art in the area which teaches the effects of the phase transformations.

Concisely, the unstable type II form of PB is colorless, transparent, soft, and easily deformed. In contrast, the stable type I polymorph is colorless, translucent, rigid, and not prone to physical deformation. In commercial applications melts of PB which are formed into desired shapes are of the type II form (easily deformable) and upon transition to a type I form often undergo undesirable shape changes. Therefore a process which accelerates this type II to type I transformation has a definite practical purpose.

The prior art has long sought a method to accelerate or to eliminate the phase transformation common to PB. Many authors have proposed methods for accelerating such transformation. Chief among these methods is mechanical stress, such as by working the polymer. This method, however, is clearly not useful where the polymer is placed into the desired finished form in a melt state since mechanical working would deform the desired shape. Other authors have proposed using seeding or nucleation to produce the crystal-crystal transition in poly(butene-1) such as described by Boor et al in the *Journal of Polymer Science,* volume 62 (174), S70–S73 (1962). Mechanical stress is described in the *Journal of Polymer Science,* part B, 1(11) 587–91 (1963). As is apparent, none of these methods are suitable for commercial use. This is especially true with the nucleation techniques which are described in U.S. Pat. No. 3,499,884, Japan Kokai 7,482,788 and U.S. Pat. No. 3,558,551, all of which utilize impurities such as transition metals and polypropylene to accelerate the phase change. However, even with these methods, transition is slower than desired and often takes long periods of time.

It would therefore be desirable to provide a simple, efficient, and easily carried out process to accelerate the phase transformation between type II PB and type I PB.

It is an object of the instant invention to accelerate the phase transformation of PB from type II to type I. Other objects will become apparent to those skilled in this art as the description proceeds.

It has now been discovered according to the instant invention that the phase transformation of crystalline PB from an unstable type II structure to a more stable type I crystal structure can be carried out in a convenient and economic fashion by treating type II PB with a volatile solvent, evaporating the solvent to produce some immediate transition to type I PB, followed by a rapid transition of the remainder of the article. The secondary transition after solvent evaporation can be accelerated by ultrasonic treatment and/or heat treatments below the PB melt temperature of about 90° C.

The method of the instant invention is suitable for PB whether treated alone or in the presence of comonomers such as ethylene, propylene, isobutylene and other olefins, or merely blends of PB and other polymers such as polypropylene, and polyethylene in admixture with PB. Other polymers, such as neoprene, butyl rubber and natural rubber should also be useful in the same manner. The instant invention is useful for converting PB from type II to type I in any proportion, whether copolymers or blends of polymers or homogenous PB. However, it is apparent that the instant invention is more useful when PB is predominant; i.e. above 50% in the copolymer or blend.

The solvents useful in the practice of the instant invention are those which produce the desired phase change. These solvents are normally volatile materials which evaporate rapidly from the surface of the polybutene, thereby causing the phase change. Representative examples of such solvents are alkane isomers, cycloalkane isomers and ethers. Representative but non-exhaustive examples of such solvents are

| | |
|---|---|
| 2,2-dimethylbutane | cycloheptane |
| 2,3-dimethylbutane | cyclohexane |
| 2,5-dimethylhexane | cyclopentane |
| 2,2-dimethylpentane | 1,1-dimethylcyclohexane |
| 2,3-dimethylpentane | 1,2-dimethylcyclohexane |
| 2,4-dimethylpentane | 1,3-cis-dimethylcyclohexane |
| 3,3-dimethylpentane | 1,3-trans-dimethylcyclohexane |
| 3-ethylpentane | 1,4-dimethylcyclohexane |
| n-heptane | methylcyclohexane |
| hexamethylethane | ethyl ether |
| n-hexane | isopropyl ether |
| 2-methylbutane | n-propyl ether |
| 2-methylhexane | n-butyl ether |
| 3-methylhexane | tert-butyl ether |
| 4-methyl pentane | tert-butyl methyl ether |
| 3-methyl pentane | diethyl ether |
| n-pentane | |
| isohexane | |
| isoheptane | |

Once the solvent has evaporated, examination of the article treated will reveal that an immediate transformation from type II to type I PB has occurred in the area contacted by the solvents. The interior of the article will be predominantly type II PB. However, the type II PB remaining is rapidly accelerated in the phase transformation to type I PB by the simple presence of the type I PB at the surface of the article. The phase transformation type II to type I of the PB in such treated articles, as rapid as it is as compared to the prior art methods, can yet be further accelerated by treatment with ultrasonic waves, or heating the article to temperatures below the melting point of the PB (about 90° L C.).

The invention is more concretely described with reference to the examples below wherein all parts and percentages are by weight unless otherwise specified. The examples are provided to illustrate the instant invention and not to limit it. Example 1 illustrates that coating a relatively thick sample of PB with a volatile material followed by evaporation results in a phase change for the polymer surface. Example 1 also shows a control experiment illustrative of the prior art. Examples 2 through 16 were carried out on films of PB and were characterized using infrared spectroscopy. The example 1 control also applies to Examples 2–16.

In particular, Example 2 illustrates that the treatment of a film with n-hexane followed by immediate evaporation of n-hexane results in acceleration of the phase change. Example 3 shows that incorporation of the PB with isobutylene has no effect upon the instant process. The copolymer was treated and showed a significant phase acceleration. Examples 4, 5, and 6 exemplify that immersing a sample of type II PB for extended periods of time offers no advantage over merely contacting and evaporating the solvent, and in some instances actually slows down the type II to type I phase transformation. Example 7 illustrates that the application of heat to the treated film results in further phase acceleration. Examples 8 and 9 demonstrate that ultrasonic sound applied to a treated film further accelerates the phase transformation. Examples 10 and 11 indicate that a volatile solvent such as diethylether or n-haptane is also effective in accelerating the phase transformation. Examples 12 and 13 are comparative examples where acetone, methanol, and water were coated on type II PB. These materials indicate no significant phase acceleration. Examples 15 and 16 illustrate that flash evaporating a solvent from the polymer surface with a hot air blast is not effective in inducing a type II to type I phase transformation.

In all examples shown below crystalline isotactic samples of PB were used. The polymer was prepared using diethyl aluminum chloride and titanium trichloride as catalysts. The monomer 1-butene was used as a solvent for the polymerization. The precipitated polymer was 93.9% insoluble in boiling ether and had a specific viscosity of 0.565 in decalin at 115° C. The unstable crystallites of type II PB were prepared by melting stable samples of polymer at 140° to 150° C. and cooling the samples immediately to room temperature. The existence of the type II polymorph was confirmed using infra-red (IR) and X-ray diffraction spectroscopy. The polymorphs of type I, II, and III PB exhibit unique infra-red spectra as demonstrated by Clampitt et al in the *Journal of Polymer Science*, C6, 43–51 (1964). These characteristic spectra were used to confirm the existence of the various polymorphs for film samples of polymer.

Thicker samples of PB were characterized using X-ray diffraction analysis. The X-ray modifications of the different types of crystal structure were described by Natta et al in *Nuovo Cimento Suppl*, 15, 52 (1966).

The X-ray diffraction measurement was performed using a standard X-ray diffractometer with nickel filtered copper potassium alpha radiation. The scattered radiation was detected with a proportional counter. In the polymers' X-ray diffraction pattern, the type II polymorph exhibits a well defined peak at an angle $2\theta$ of 11.8°. The fraction of PB transformed at a particular time was obtained by comparing its X-ray pattern at $2\theta$ of 11.8° with the fresh melt.

EXAMPLE 1

A sample of PB 0.18 cm thick was heated to 150° C. and melted. The sample was then cooled immediately to room temperature, simulating the production of a freshly formed pipe of PB. The X-ray diffraction pattern of the sample was recorded 0.35 hours after melt. The diffraction pattern indicated virtually no phase transformation had occurred. The sample of polymer remained in its unstable type II state. The X-ray pattern compared exactly to the type II polymorph previously described by Natta and co-workers (referenced above). After 17.7 hours there existed a 5.6% phase change to the more stable type I state. The percentage type II PB transformed against time after melt is presented in Table 1.

A second sample of the polymer of PB as described above was cooled to room temperature and coated with a layer of n-hexane. The solvent was allowed to immediately evaporate. The polymer's X-ray diffraction pattern was analyzed indicating that 40.7% of the type II polymer was transformed to the more stable polymorph in 0.25 hours after melt. The sample was reanalyzed after 17.7 hours showing that 76.4% of the polymer had transformed to the stable type I polymorph. A comparison of both samples are set forth in Table 1. The X-ray diffraction analysis does not indicate the entire sample but illustrates the amount of transformation. The comparisons were carried out in the same fashion and are thus directly comparable.

TABLE I

| % TYPE II PB-1 TRANSFORMED VS. TIME AFTER MELT | | |
|---|---|---|
| Average Time Hr | Control % | Hexane Treated % |
| 0.35 | 0.0 | 40.1 |
| 17.7 | 6.5 | 78.3 |
| 46.5 | 21.7 | 84.3 |
| 210.9 | 63.8 | 85.3 |
| 356.8 | 71.7 | 85.7 |

EXAMPLE II

A film of stable PB was heated to 140° C. and cooled to room temperature. The IR spectrum of the sample was recorded showing the presence of the unstable type II polymorph. (The type II and type I polymorphs exhibit absorption peaks under IR at 900 and 925 cm$^{-1}$ respectively). The extent of type II to Type I transformation was determined by comparing the relative intensities of the absorption bands at a particular time. The half-life of the type II to type I transformation process for the control sample at room temperature in air was 23.5 hours.

A film of type II PB was prepared as described above and an IR spectrum recorded showing the exclusive formation of the type II polymorph. The sample was coated with n-hexane and the solvent was allowed to evaporate within 10–15 seconds. The IR spectrum indicated that 54.5% of the type II polymorph had transformed to the type I structure within five minutes. Comparison of the two experiments is shown in Table 2, which illustrates the rapid rate of coated samples compared to uncoated samples.

TABLE 2

% TYPE II PB-1 TRANSFORMED VS. TIME AFTER MELT

| Hrs. | Type II % | Type I % |
|---|---|---|
| | No solvent | n-hexane |
| 0 | 0 | 0 |
| 0.12 | 0 | 54 (.06 hr). |
| 6.55 | 43 | |
| 9.33 | 46 | |
| 23.5 | 50 | |
| 48.6 | 55 | |
| 74.3 | 63 | |
| 191.8 | 95 | |

EXAMPLE 3

A film of type II PB containing 6.9% of isobutylene copolymer was prepared. The existence of the type II polymorph was confirmed by infra-red spectroscopy. The sample of polymer was coated with n-hexane and allowed to evaporate at room temperature. The IR spectrum indicated that 51.5% of the type II polymorph was converted to the stable type I structure within five minutes.

EXAMPLE 4

A film of type II PB homopolymer was immersed in a bath of n-hexane at ambient temperature for 2 minutes. The solvent was allowed to dry and the IR spectrum indicated that 45.7% of the type II polymorph was converted to the type I structure.

EXAMPLE 5

A film of type II PB prepared and characterized as described in Example 2 was immersed for five minutes in n-hexane, dried and analyzed. The IR spectrum was immediately recorded and indicated that 45.6% of the polymer had converted to the type I polymorph.

EXAMPLE 6

A film of type II PB was prepared and characterized as described in Example 2. The film was immersed in n-hexane for a period of 17.5 hours at room temperature. The IR spectrum of the sample showed that 45.8% of the type II polymorph had converted to the stable type 1 structure. In comparison to those samples in which the n-hexane was immediately evaporated, the present example illustrates the deacceleration of the type II to the type 1 process indicating that immersion for long periods is not desirable.

EXAMPLE 7

A film of type II PB prepared as described in Example 2 was coated with n-hexane and the solvent was evaporated at room temperature in air. Immediate infra-red analysis showed a 51.7% type II to type I transformation had taken place. The sample of PB was then heated for 1 hour (dry) at 90° C. and reanalyzed in the infra-red region of the spectrum. The analysis showed that 55% of the sample had transformed to the type I structure.

EXAMPLE 8

A film of type II PB was prepared and characterized as described in Example 2. The sample was coated with n-hexane and the solvent was then allowed to evaporate. The sample of PB was then placed in a water bath and subjected to ultrasonic waves (50 watts, 50–55 KHz) for exactly 10 minutes. The film was immediately analyzed using infra-red spectroscopy which revealed that 59.3% of the polymer had transformed to the more stable type I structure. The film was then subjected to an additional 10 minutes of ultrasonic sound after which greater than 64% of the polymer had transformed to the stable type I structure.

EXAMPLE 9

A film of PB containing 53.3% type 1 and 46.7% type II PB was subjected to ultrasonic waves (50 watts, 50–55 KHz) for exactly 10 minutes in water at room temperature. The sample was then analyzed in the IR region, which showed that 63.3% of the PB was present in the type I polymorph.

EXAMPLE 10

A film of type II PB was prepared as characterized as described in Example 2. The sample of polymer was coated with diethyl ether and the solvent was immediately evaporated resulting in a 50.7% type II to type I transformation as determined by IR spectroscopy.

EXAMPLE 11

A film of type II PB was dipped into a bath containing n-heptane at room temperature. The solvent was allowed to evaporate at ambient temperatures in air. Subsequent infra-red analysis showed that a 50.5% type II to type I transformation had taken place.

EXAMPLE 12

A film of type II PB was dipped into a beaker containing methanol at room temperature. The solvent was evaporated as described in Example 11 and dried. The infra-red spectrum of the treated sample showed virtually no change had taken place from type II to type I. When the experiment was repeated with acetone, a small change from type II to type I was recorded.

EXAMPLE 13

A film of type II PB was dipped into a beaker containing water at room temperature. The water was removed from the sample by evaporation (excess water blotted off). An infra-red analysis of the sample was taken, indicating that virtually no change in the amount of type PB had been generated.

EXAMPLE 14

A sample of type II PB was passed over a boiling flask containing n-hexane. The vapors contacted the sample for five seconds, condensing upon the PB (equivalent to immersion in a beaker and subsequent removal). The condensed solvent was evaporated at room temperature. Infra-red analysis showed that a 40.7% type II to type I transformation had taken place. This example shows that contact only is necessary, and the method of application can be varied.

EXAMPLE 15

A sample of type II PB was coated with n-hexane and the solvent evaporated by immersing in a stream of hot air. The IR spectrum of the treated disc indicated virtually no type II to type I transformation had occurred, indicating that normal evaporation was best.

EXAMPLE 16

A sample of type II PB was coated with diethyl ether and the solvent was evaporated by subjecting the solvent to a stream of hot air. The IR spectrum of the treated disc indicated virtually no type II to type I transformation had taken place.

EXAMPLE 17

A sample of type II PB was immersed in liquid nitrogen for a sufficient time to allow complete cooling of the sample. The sample was removed from the liquid nitrogen and allowed to come to ambient temperature. Subsequent infra-red analysis of the sample indicated that no type II to type I transformation had taken place.

Thus it is apparent that the instant invention has provided a surprisingly simple, inexpensive and effective method for accelerating the phase transformation from the unstable type II to the stable type I polymorph of PB. The method is simple, effective, and can be accelerated by further treatment with heat or ultrasonic sound.

While certain embodiments and details have been shown for the purpose of illustrating this invention, it will be apparent to those skilled in this art that various changes and modifications may be made herein without departing from the spirit or the scope of the invention.

I claim:

1. A method for accelerating polybutene phase transformation from type II to type I, the method comprising applying a solvent selected from the group consisting of alkane isomers, cycloalkane isomers, and ethers to polybutene in type II form, said solvent evaporating and causing an immediate phase change to type I form in the area contacted thereby accelerating phase transformation to a stable polybutene type I form throughout the polybutene.

2. A method as described in claim 1 wherein the solvent is selected from the group consisting of diethyl ether, n-heptane, pentane, hexane, isoheptane, isohexane, 2,2-dimethylbutane, 2,3-dimethylbutane, 2,5-dimethylhexane, 2,2-dimethylpentane, 2,3-dimethylpentane, 2,4-dimethylpentane, 3,3-dimethylpentane, 3-ethylpentane, hexamethylethane, n-hexane, 2-methylbutane, 2-methylhexane, 3-methylhexane, 4-methylpentane, 3-methylpentane, n-pentane, cycloheptane, cyclohexane, cyclopentane, 1,1-dimethylcyclohexane, 1,2-dimethylcyclohexane, 1,3-cis dimethylcyclohexane, 1,3-trans dimethylcyclohexane, 1,4-dimethylcyclohexane, methylcyclohexane, methylcyclopentane, isopropyl ether, n-propyl ether, tert-butyl ether, tert-butyl methylether, or mixtures of these.

3. A method as described in claim 2 wherein phase transformation is further accelerated with ultrasonic sound waves.

4. A method as described in claim 2 wherein phase transformation is further accelerated with the application of heat below 90° C.

5. A method as described in claim 2 wherein a volatile solvent is applied to copolymers of butene and isobutylene, copolymers of butene and propylene, copolymers of butene and ethylene, blends of polybutene with polyisobutylene, blends of polybutylene with polypropylene, and blends of polybutylene with polyethylene.

* * * * *